United States Patent [19]

Prager

[11] 4,079,298

[45] Mar. 14, 1978

[54] OPEN-LOOP D.C. MOTOR OF PRINTER CARRIAGE SPEED

[75] Inventor: Jay Prager, Hudson, N.H.

[73] Assignee: Centronics Data Computer Corporation, Hudson, N.H.

[21] Appl. No.: 631,862

[22] Filed: Nov. 14, 1975

[51] Int. Cl.$^2$ .............................................. H02P 7/14

[52] U.S. Cl. ...................................... 318/260; 318/280

[58] Field of Search ............... 318/248, 256, 257, 260, 318/261, 263, 276, 280, 283, 373, 374, 384, 385, 391, 400, 411, 427, 440, 442, 452, 484

[56] References Cited

U.S. PATENT DOCUMENTS

| | | | |
|---|---|---|---|
| 2,855,553 | 10/1958 | Morgan | 318/248 |
| 3,305,718 | 2/1967 | Waldron | 318/373 X |
| 3,443,186 | 5/1969 | Martin | 318/257 |
| 3,471,073 | 10/1969 | Brown et al. | 318/260 X |
| 3,544,874 | 12/1970 | Dutko et al. | 318/380 |
| 3,869,653 | 3/1975 | Masuzawa et al. | 318/373 X |

OTHER PUBLICATIONS

IBM Technical Disclosure Bulletin, vol. 6, No. 10, Mar. 1964, pp. 85, 86.

*Primary Examiner*—Robert K. Schaeffer
*Assistant Examiner*—W. E. Duncanson, Jr.
*Attorney, Agent, or Firm*—Louis Weinstein

[57] ABSTRACT

Open-loop means for controlling the speed of a d.c. motor controlled print head moving across a document. A switch couples a first voltage to the d.c. motor to accelerate the print head in a first direction. When the print head reaches the desired velocity, the first voltage is decoupled from the motor and a highly regulated voltage is coupled to the d.c. motor to move the print head at the desired velocity. The switch reverses the voltage polarity at the input terminals of the d.c. motor to decelerate the print head, accelerate it in the opposite direction and maintain the desired velocity as it moves in the reverse direction. Logic means detects the direction of carriage movement and connects the first voltage to the d.c. motor for an interval sufficient to bring the d.c. motor to the desired speed in the shortest practical interval. The second voltage maintains the constant speed until the print head reaches the end of the line. At the end of a line, the logic means reverses the polarity to the motor and reapplies the first voltage for the same interval initially required for acceleration, decelerate and halt the print head, or alternatively applies the opposite polarity first voltage for twice said time interval to being the motor to constant speed in the reverse direction in the shortest practical interval.

The acceleration voltage for carriage return is applied for a shorter interval if less than a full line is printed, to prevent damage due to excessive acceleration.

40 Claims, 12 Drawing Figures

FIG. 3
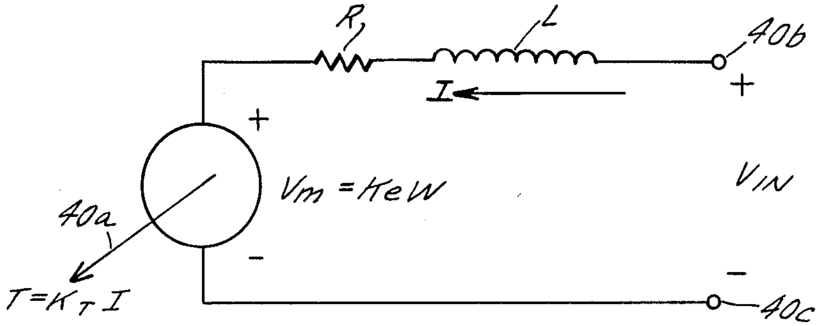
FIG. 5a
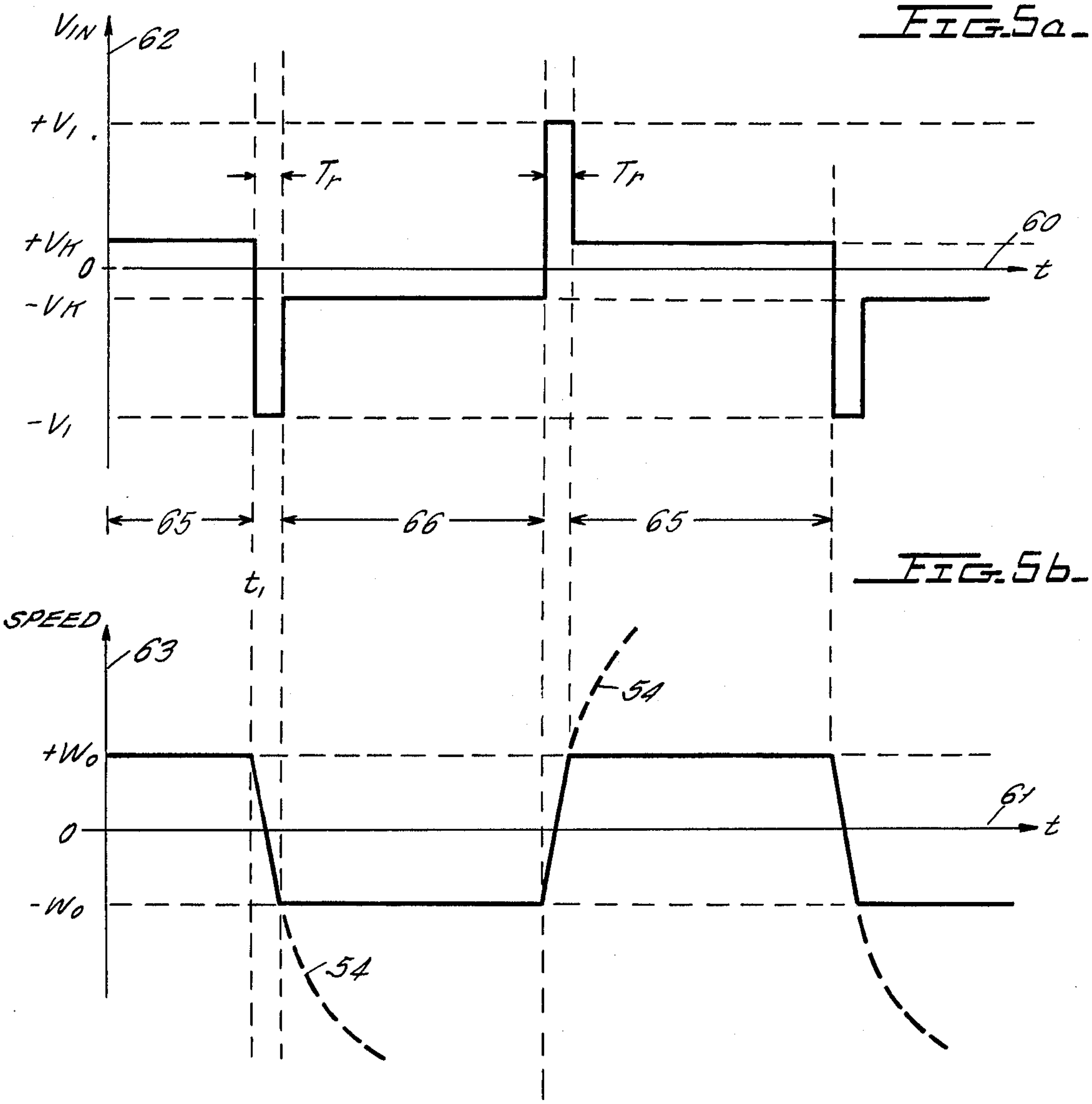
FIG. 5b

OPEN-LOOP D.C. MOTOR OF PRINTER CARRIAGE SPEED

BACKGROUND OF THE INVENTION

The present invention relates to line printers and more particularly to novel open-loop D.C. motor control apparatus for providing essentially constant printing speed thereof.

It is well known that the quality of printing in an electronic dot-matrix impact printer depends largely upon the magnitude of speed variations as the print head moves across the printing medium. The degree of registration of the printed dots forming each character, and hence the overall print quality, is reduced due either to variations in speed during printing or by initial print head acceleration to a speed beyond the desired constant speed. In a typical impact printer, the carriage driving motor is continually operated directly from the main printer power source, without the possibility of adjusting the motor voltage and hence the motor output speed. The continuously energized motor is coupled to the printer carriage via a speed reducer, a pair of clutches energizable in mutually exclusive fashion for selecting movement in the forward or the reverse directions, and a brake mechanism energizable to remove the driving torque from the carriage and rapidly overcome its inertia thereby halting the carriage. Such a carriage drive system is not only bulky but also requires a large number of costly components. Additionally, there is no manner in which the desired constant printing speed may be easily obtained, nor is any system adjustment provided to prevent carriage speed overshoot when the carriage is initially accelerated in either direction upon engagement of either the forward or the reverse clutch mechanism.

In a line printer adapted to print during carriage travel in both the forward and reverse directions, each change of direction of travel requires that the energized clutch be decoupled from the motor and the brake mechanism be energized to substantially halt carriage motion to allow the remaining clutch to be energized against a relatively low reverse torque. The relatively long actuation time intervals of the electro-mechanical mechanisms required by this interrelationship significantly reduces useful printer speed as a significant portion of total carriage travel time is used solely for direction reversal.

In a line printer adapted to print during carriage travel only in the forward direction, increased printer performance requires that the carriage not only be smoothly accelerated to a constant printing speed in the forward direction but also that the duration of travel in the reverse direction be as short as practical. One suggestion for achieving rapid reverse travel comprises additional gearing means in the reverse clutch mechanism to more rapidly accelerate the carriage in the reverse direction, thereby requiring a shorter travel time interval. This solution is undesirable as requiring additional costly mechanical components and is especially undesirable in a printer of the unidirectional-printing type adapted for a return operation after printing a variable portion of a line of characters in the forward direction, as the carriage may be damaged if increased reverse acceleration and return speed are not controlled in proportion to the length of line printed.

In either line printer type, a braking operation to temporarily halt the motion of the carriage at any time and at any point along the line may still be required.

It is desirable to provide a line printer with a motor control means allowing removal of the forward and the reverse motion clutches and the separate braking mechanism, while providing rapid acceleration to printing speed without overshoot and then maintaining essentially constant print head speed while the carriage-mounted printed head traverses the width of the printing medium. It is also desirable to provide a motor control means allowing rapid acceleration to printing speed in an opposite direction; braking capability at any point along its path of travel; and in a unidirectional type printer, increased acceleration in the reverse direction.

BRIEF SUMMARY OF THE INVENTION

An open-loop D.C. motor control for printer carriage speed, realizing the above-stated goals, includes means for selectively connecting, with first and second polarities, the D.C. motor input terminals of a D.C. motor to a positive D.C. voltage source, so as to cause an output shaft of the motor to rotate respectively in a first or a second direction; first means coupled to the direction selective means for applying a first voltage amplitude to the motor terminals for a short time interval sufficient to accelerate the output shaft speed to a desired constant printing speed; second means for applying an adjustable regulated second D.C. voltage, having a magnitude less than the first D.C. voltage, to the direction selective means upon the cessation of the acceleration time interval to maintain the constant motor output shaft speed; and logic means coupled to the direction selective means for reversing the polarity of D.C. voltage applied to the first and second motor input terminals, responsive to a reverse-direction signal and for energizing the first means for twice the normal acceleration time interval to substantially rapidly decelerate the motor output shaft speed to zero and then accelerate the motor output shaft speed in the reverse direction until the desired constant output shaft speed is reached in the opposite direction of rotation.

In one preferred embodiment, gating means senses the absence of motion-enabling signals to energize the logic means to reverse the polarity of D.C. voltage applied to the motor input terminal and to enable third means for energizing the first means for the normal acceleration time interval to substantially rapidly decelerate the motor output shaft speed to zero and halt the motion of the printer carriage at any time and in any position.

In another preferred embodiment, charging of a capacitor is initiated at the initiation of motion in a forward, or print, direction whereby the charge on the capacitor at any instant of time is indicative of the duration of motion in the forward direction and hence the length of line printed. The capacitor voltage is coupled to one input of a voltage comparator whose other input is held at a fixed D.C. reference voltage. A comparator output enables the direction-reversing means to accelerate the motor output shaft speed in the reverse direction only for a variable time interval until the capacitor voltage is discharged below the fixed reference voltage, thereby rapidly returning the printed carriage to the initial position to enable printing of the next line while preventing the application of the increased acceleration voltage for an excessively long time interval to prevent damage to the printer carriage.

Accordingly, it is one object of the present invention to provide novel motor control appratus for achieving constant printing speed in an impact printer.

Another object of the present invention is to provide novel motor control apparatus for accelerating an impact printer mechanism to a constant printing speed in as short an acceleration time interval as is practical.

Still another object of the present invention is to provide novel apparatus for rapidly reversing the direction of movement of an impact printer mechanism to either a forward or a reverse direction.

Yet another object of the present invention is to provide novel apparatus to rapidly decelerate and halt the carriage of an impact printer when moving in either direction in as short a time interval as practical.

A further object of the present invention is to provide novel apparatus for accelerating the carriage of a unidirectional impact printer to the return position to enable printing of a next successive line in a variable time interval established by the fractional portion of the previous printed line, to prevent excessive acceleration in the return direction and damage to the impact printer.

These and other objects of the present invention will become apparent from the following detailed description and the drawings.

BRIEF DESCRIPTION OF THE FIGURES

FIG. 3 is a schematic diagram of the equivalent circuit of a direct current motor and useful in understanding the principles of the present invention;

FIGS. 5*a* and 5*b* are coordinated graphs respectively illustrating the motor voltage and the motor output shaft rotation speed for proper reversal of the printer carriage direction of motion;

DETAILED DESCRIPTION OF THE INVENTION

Figure 1:
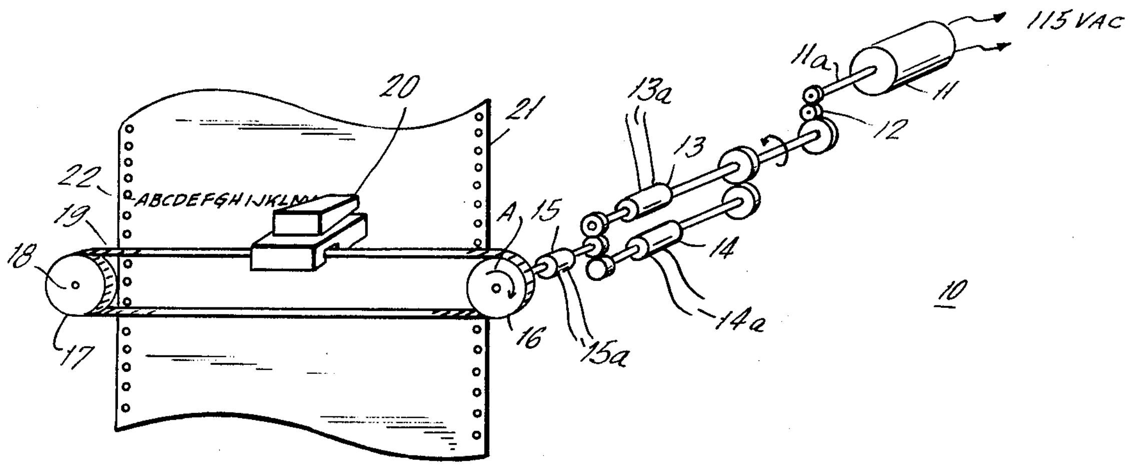
FIG. 1 PRIOR ART
FIG. 1 is a schematic representation of a typical prior art printer carriage drive apparatus.

Referring initially to FIG. 1, a typical prior art A.C. drive apparatus comprises a continuously rotating A.C. motor 11 coupled via a speed reduction gear 12 to the inputs of both a forward motion clutch 13 and a reverse motion clutch 14. Typically, A.C. motor 11 is directly connected to the A.C. line input to impact printer 10 without means for controlling the speed of the motor output shaft, 11*a*, which is free to change with changes in mechanical loading and A.C. line conditions.

The normally deenergized outputs of both forward and reverse clutches 13 and 14 are coupled to the input of a selectively actuatable brake mechanism 15 whose output is coupled for rotation to a first carriage drive pulley 16. A second carriage drive pulley 17 free-wheelingly rotates about shaft 18 and is spaced a sufficient distance from first carriage drive pulley 16 to tautly maintain and rotate carriage belt 19 entrained thereabout. Print carriage 20 is permanently affixed to a portion of carriage belt 19.

Upon energization of forward motion clutch input 13*a*, drive pulley 16 rotates in the clockwise direction of arrow A and print carriage 20 moves to the right across the paper document 21 while a line of characters 22 is selectively printed thereon. Once forward clutch input 13*a* is energized, the mechanical coupling between A.C. motor 11 and carriage 20 is invariant; the carriage speed is established only by the stability of the A.C. line voltage and the unique torque-speed characteristics of the particular A.C. motor 11 utilized.

Similarly, upon release of clutch 13 and upon energization of reverse clutch input 14*a*, the direction of rotation of first carriage drive pulley 16 is rotated counterclockwise to move print carriage 20 to the left across paper document 21. It should be immediately obvious that no method exists to adjust the drive system to prevent carriage speed overshoot when either of the forward or reverse clutches 13 and 14, respectively, are engaged.

Upon deenergization of either clutch input 13*a* or 14*a*, the inertia of print carriage 20 and of carriage drive pulleys 16 and 17, causes continued movement in the previously energized direction. This movement is halted by the energization of brake mechanism input 15*a* upon the deenergization of either clutch mechanism input 13*a* or 14*a*, to rapidly decelerate and halt movement of print carriage 20.

Figure 2:
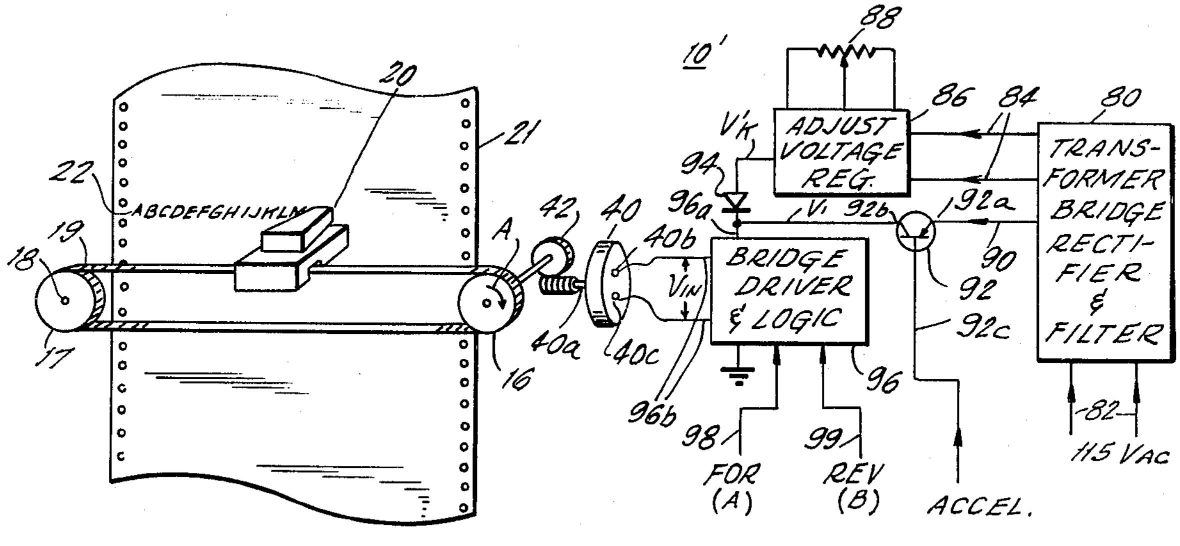
FIG. 2 is a block diagram schematically illustrating the interrelationship between the mechanical movement portion of a typical impact printer and the openloop control apparatus for a D. C. motor coupled thereto, in accordance with the principles of the present invention.

Referring now to FIG. 2, wherein like reference designations are utilized for like elements, another impact printer 10' utilizes a D.C. motor 40, such as a "pancake" or "printed circuit" motor, having low rotor inertia. A motor output shaft 40*a* is coupled through speed reduction gears 41 and 42 to first carriage drive pulley 16 and carriage belt 19 to drive print carriage 20 in the forward direction, as indicated by arrow A, across paper document 21 in the event a positive voltage polarity has been applied to a first motor input terminal 40*b* with respect to a second motor input terminal 40*c*.

The direction of rotation of output shaft 40*a*, and hence of carriage pulleys 16 and 17, carriage belt 19 and carriage 20, is reversed by application of the positive polarity D.C. voltage to second motor input terminal 40*c* with respect to first D.C. motor input terminal 40*b*, obviating the need for separate forward and reverse clutches 13 and 14 (FIG. 1).

A D.C. motor has an inherent braking capability when its input terminals are directly connected to one another, obviating the need for a separate brake mechanism 15 (FIG. 1). Additionally, the rotational speed W of output shaft 40*a* is controllable independent of A.C. line voltage variations by adjusting the magnitude of a highly regulated D.C. motor drive voltage $V_{in}$ applied between input terminals 40_b_ and 40_c_.

Referring now to all of FIGS. 1–5_b_, the equivalent circuit (FIG. 3) of a permanent magnet D.C. motor 40, having an input voltage of magnitude $V_{in}$ applied with positive polarity to input terminal 40_b_, includes a series circuit having an equivalent motor inductance L, an equivalent motor resistance R and a generator of motor back electromotive force $V_m$. The torque T developed on output shaft 40_c_ is proportional to the current I flowing into motor input terminal 40_b_ for the indicated polarity of input voltage $V_{in}$. The rotational speed W of output shaft 40_a_, and hence the speed of print carriage 20, is given for any input voltage $V_{in}$ by the dynamic equation:

$$(J_L + J_m) \cdot \left(\frac{dW}{dt}\right) + \left(\frac{K_t K_e}{R}\right) \cdot W = \left(\frac{K_t V_{in}}{R}\right) - To \quad (1)$$

where: $J_L$ is the inertia of print carriage 20, pulleys 16 and 17, belt 19 and gears 12 referred to motor output shaft 40_a_; $J_m$ is the inertia of motor 40; $K_e$ and $K_t$ are, respectively, the back-EMF and torque constants of motor 40; and $T_o$ is the system residual friction referred back to motor output shaft 40_a_ as torque.

Assuming motor 40 is initially deenergized, a step of input voltage is applied between motor input terminals 40_b_ and 40_c_ and the resulting rotational speed W at output shaft 40_a_ is given by:

$$W = \frac{1}{K_t K_e} \cdot (V_{in} K_t - T_o R) \cdot (1 - e^{-St}) \quad (2)$$

where $$S = \frac{K_t K_e}{(J_L + J_m)R} = \frac{1}{\tau}$$

and $\tau$ is the system time constant. For an applied step of input voltage $V_{in}$, motor output velocity W exponentially approaches a final steady-state value $W_f$ with a time constant S.

The minimum input voltage required to reach a constant motor rotational speed $W_o$, corresponding to a constant carriage velocity, is determined from equation (2); the required motor input voltage $V_K$ is:

$$V_K = K_e \cdot W_o + T_o R / K_t \quad (3)$$

The output rotational speed W of motor output shaft 40_a_ will accelerate to a value equal to 95% of the desired constant final velocity $W_o$, after a time interval of $3\tau$ after step input energization of motor 40.

The required time interval to accelerate output shaft 40_a_ is appreciably shortened by initially applying an input voltage $V_1$ of much greater amplitude than $V_K$ to motor input terminals 40_b_ and 40_c_, to drive motor output shaft 40_a_ toward a rotational speed $W_f$ much greater than the desired constant speed $W_o$.

Figure 4A:
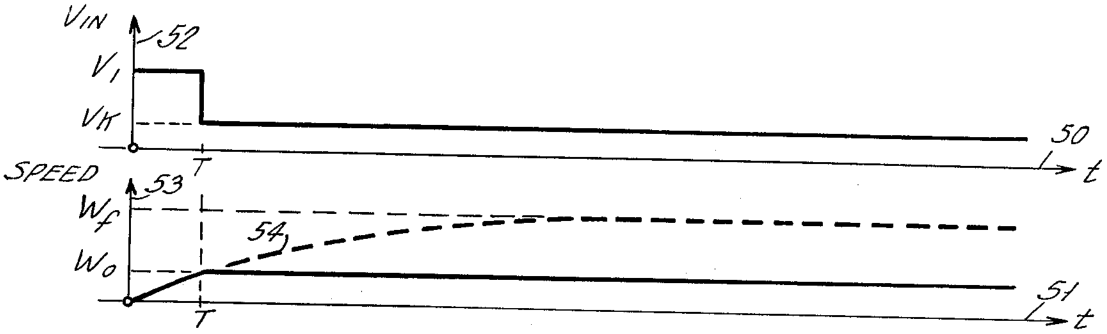
FIGS. 4*a*, 4*b* and 4*c* are coordinated graphs illustrating the effect on final carriage speed caused by respective, correct, excessively long, and insufficiently short time intervals of initial acceleration, and which are useful in understanding the principles of the present invention.
Figure 4B:
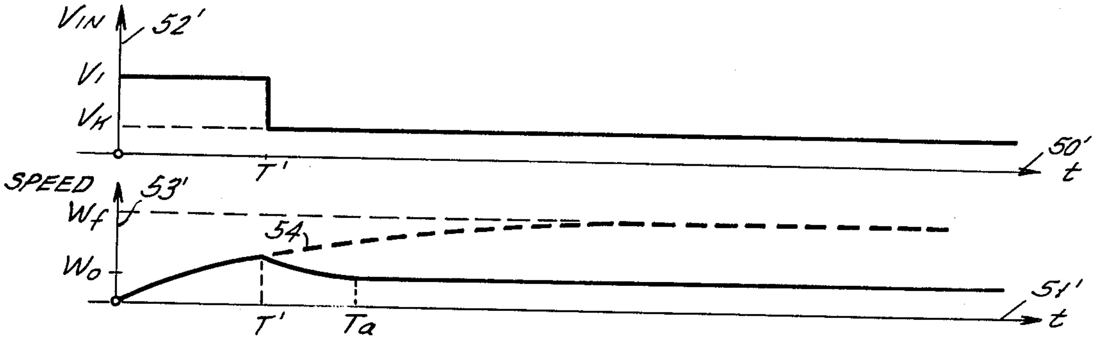
Figure 4C:
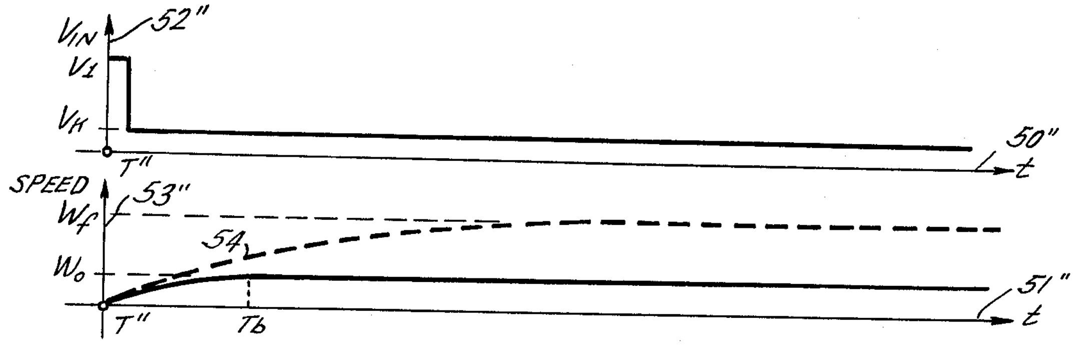

If the increased acceleration voltage $V_1$ is applied for the correct acceleration time interval T, as shown in FIG. 4_a_, where respective abscissas 50 and 51 indicate equal increments of elapsed time and ordinates 52 and 53 respectively indicate the magnitude of motor input voltage $V_{in}$ and motor output speed W, the application of the increased acceleration voltage $V_1$ causes motor output speed W to exponentially increase toward final speed $W_f$ as indicated by broken curve 54. If the increased acceleration voltage $V_1$ is replaced by the constant speed input voltage $V_k$ after a time interval T when the motor output speed is exactly equal to the desired constant speed $W_o$, the velocity of carriage 20 reaches its constant operating value in the shortest possible time interval consistent with application of accelerating voltage value $V_1$.

FIGS. 4_b_ and 4_c_ illustrate the effects of acceleration voltage time intervals T' and T'' which are too long and too short, respectively, to accelerate carriage 20 to its final operational velocity in a minimum amount of time. Abscissas 50', 51', 50'' and 51'' all indicate the same intervals of time as in FIG. 4_a_; ordinates 52' and 52'' both indicate the same voltage magnitudes, and ordinates 53' and 53'' both indicate the same magnitudes of speed, as indicated by respective ordinates 52 and 53 in FIG. 4_a_. Thus, in FIG. 4_b_ the initial acceleration time interval T' is excessively long and the value of speed rises along exponential charging curve 54 to exceed the desired value of speed $W_o$ at the end of time interval T', resulting in some degree of speed overshoot and requiring additional time for the system to exponentially settle to the desired speed $W_o$. A total time interval $T_a$ ($T<T'<Ta$) must elapse for constant speed $W_o$ to be attained.

In FIG. 4_c_, the initial acceleration time interval T'' is too short and the output speed W at the end of time interval T'' is less than the desired operating speed $W_o$. The constant input voltage $V_k$ is now applied to motor input terminals 40_b_ and 40_c_ and the rotational speed continues to increase, but at a slower rate, toward desired speed $W_o$ and requires a total acceleration time interval $T_b$ where ($T''<T<T_b$).

Thus, it is desirable to have as large a value of acceleration voltage $V_1$ as is possible, consistent with such overall system constraints as motor and semiconductor voltage ratings. The required duration of the acceleration time interval T is given by:

$$T = \frac{(J_L + J_m)R}{K_t K_e} \cdot \ln\left(1 - \frac{W_o K_e}{V_1 - \frac{T_o R}{K_t}}\right) \quad (4)$$

In a preferred embodiment, the duration of time interval T is adjustable to accommodate motor-to-motor differences.

Motor output shaft 40_a_ is braked to zero rotational speed in the shortest time interval by the application of a deceleration voltage having the same magnitude as $V_1$, but of opposite polarity to the acceleration voltage, and applied for the same time interval T to motor input terminals 40_b_ and 40_c_, respectively. The rotational speed of motor 40 is rapidly reduced towards a final speed $W_f$ in the opposite direction of rotation and the motor input voltage $V_{in}$ is reduced to essentially zero volts at the end of the braking time interval T when the output shaft speed is essentially zero.

As shown in FIG. 5_a_ and 5_b_, where respective coordinately scaled abscissas 60 and 61 have equal time increments and respective ordinates 62 and 63 indicate the magnitude of motor input voltage $V_{in}$ and output speed W respectively, motor 40 is reversed and accelerated in the opposite direction to the same value of constant speed in the following manner: carriage 20 is travelling in a first direction at speed $+W_o$ responsive to the application of a $+V_k$ voltage, as shown in regions 65, until its furthest travel in that direction is reached at time $t_1$. An accelerating voltage of opposite polarity ($-V_1$) is applied to input terminals 40*b* and 40*c* for a reversal time interval $T_r$ to accelerate motor 40 from the initial value of $+W_o$ to a final value of $-W_o$. At the end of time interval $T_r$ the motor input voltage $V_{in}$ is switched to the opposite polarity constant speed input voltage ($-V_K$) to return carriage 20 in the opposite direction with constant speed $-W_o$, in regions 66. The duration of the reversal time interval is given by:

$$T_r = \frac{(J_L + J_m)R}{K_t K_e} \cdot \ln\left(1 - \frac{2W_o K_e}{V_1 - \frac{T_o R}{K_t}}\right) \quad (5)$$

If the motion of carriage 19 must cease after the printing of each line while printer 10' is cycled through a data input operation, the value of acceleration time interval T as given in equation (4) must be utilized. However, if printer 10' takes in data during its printing time interval, carriage 19 may be continuously in motion back and forth across the width of paper document 21 and a reversal time interval $T_r$ as given by equation (5) is utilized to increase the effective printing speed.

In a preferred embodiment, the required voltage input $V_{in}$ for voltage D.C. motor 40 is derived from a multi-output level power supply 80 (FIG. 2) connected to the main A.C. input lines 82 of printer 10'. A first D.C. voltage is provided on power supply output lines 84 to energize an adjustable voltage regulation means 86 having an adjustable potentiometer 88 coupled thereto for setting the value of regulated output voltage $V_k'$. Power supply 80 also provides a relatively higher voltage on another output voltage line 90 to the emitter electrode 92*a* of a switching transistor 92 having a collector electrode 92*b* at which accelerating voltage $V_1$ will appear when the base electrode 92*c* thereof receives an accelerate signal ACCEL at a voltage level sufficient to saturate transistor 92. Acceleration voltage $V_1$ and regulated voltage $V_k'$, as applied through a diode, 94, are both coupled to the voltage input 96*a* of a bridge driven means 96. The input voltage $V_{in}$ for motor 40 appears at bridge driver output terminals 96*b* with a first polarity responsive to the presence of a forward motion logic signal FOR on line 98 and with a reverse polarity for a reverse motion logic signal REV on line 99 to energize printer carriage 20 to its desired operating speed in the respective forward and reverse directions.

Figure 6A:
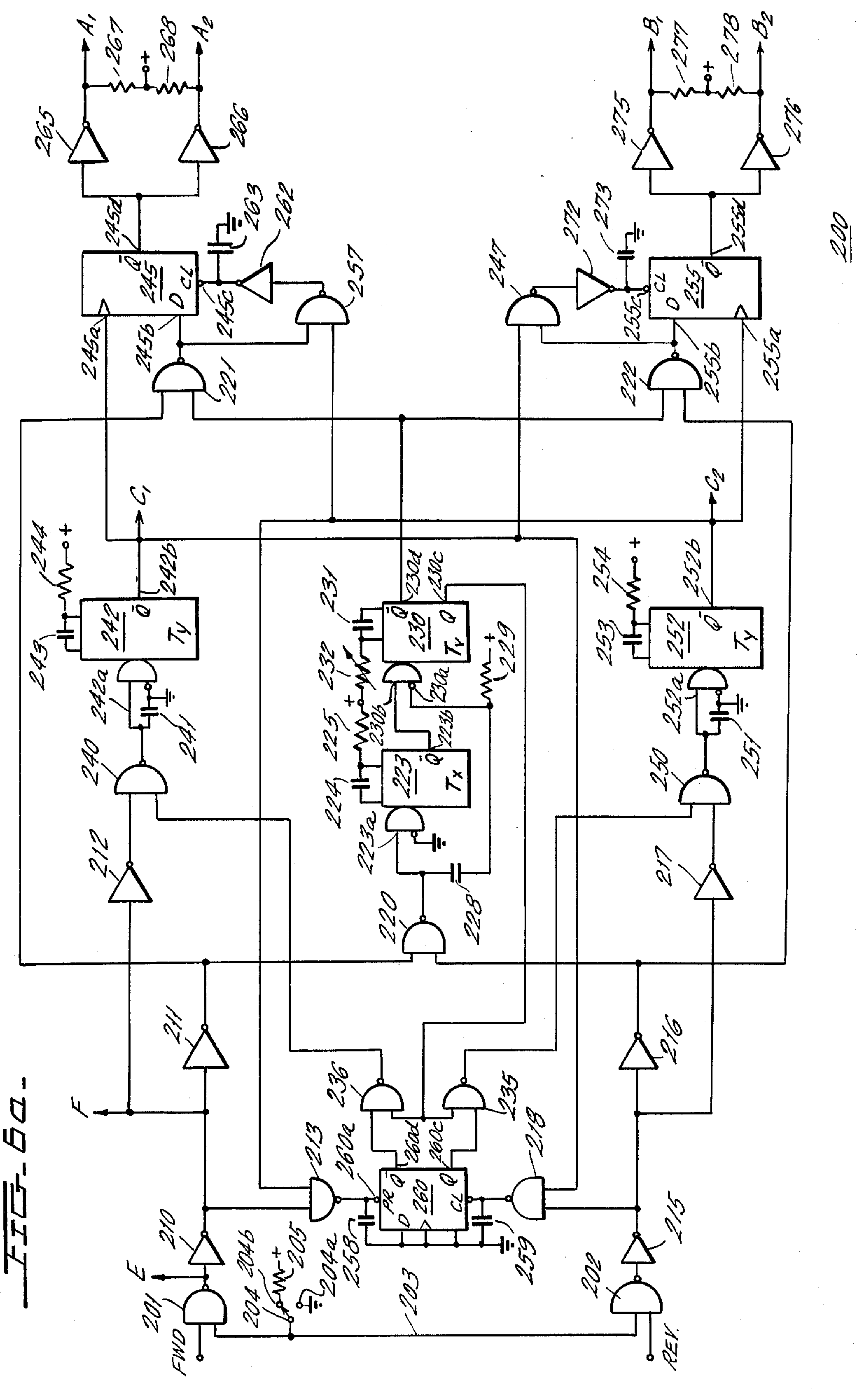
FIGS. 6*a* and 6*b* are schematic diagrams illustrating logic means for applying a large acceleration voltage to the D.C. motor for a correct acceleration time interval and for maintaining a constant voltage upon D.C. motor of proper polarity for motion in either direction after the initial acceleration interval has ended.
Figure 6B:
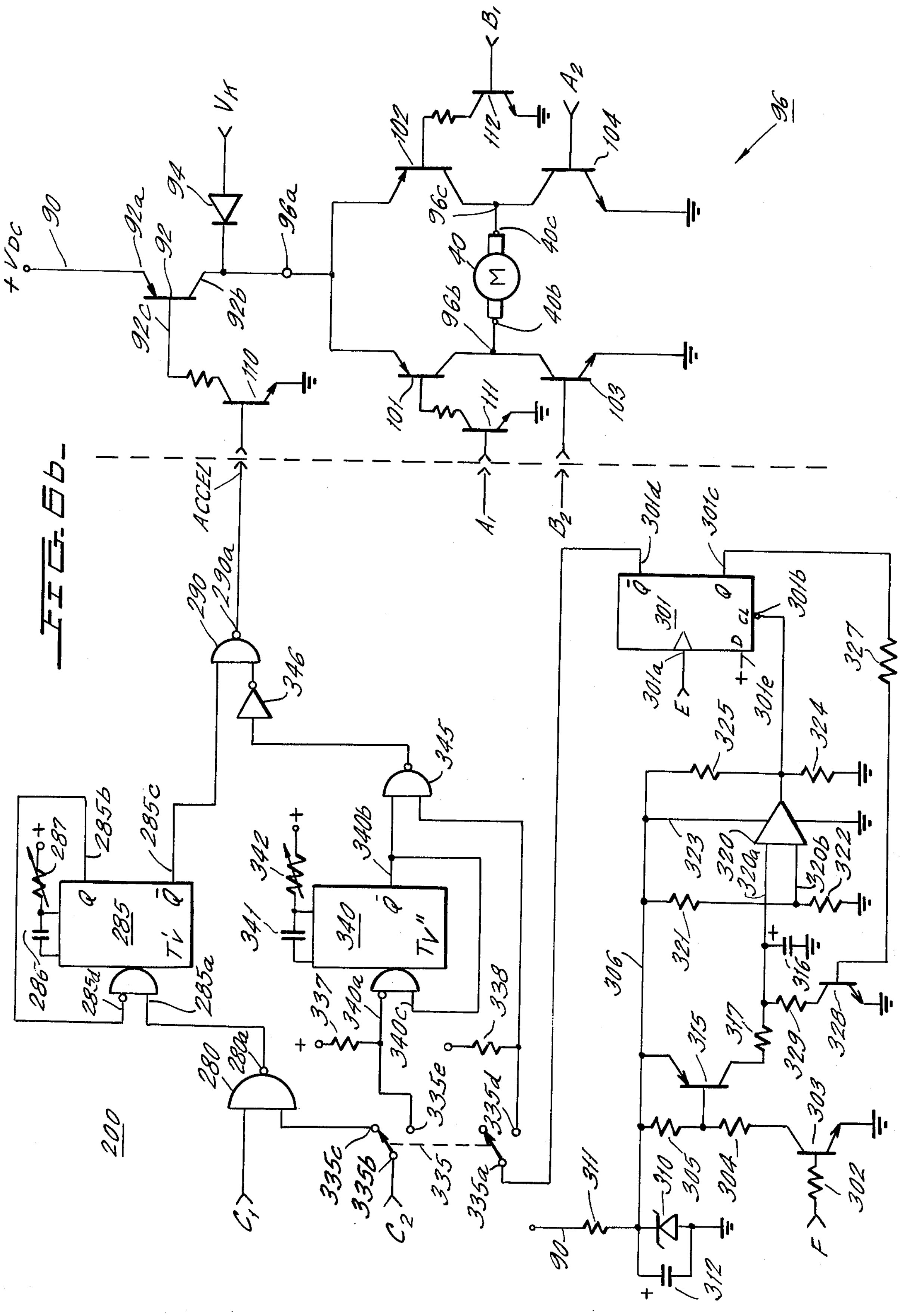

Referring now particularly to FIGS. 6*a* and 6*b*, a preferred embodiment of bridge driver means 96 and of logic means 200 supplying the required logic signals thereto will be described in terms of both positive-logic, having a logic one level for an active state, and negative-logic, having a logic zero level for an active state.

Bridge driver means 96 comprises first and second PNP transistors 101 and 102, respectively, having their collector electrodes respectively coupled to bridge driver output terminals 96*b* and 96*c* and having their emitter electrodes coupled in common to voltage input terminal 96*a*. First and second NPN transistors 103 and 104, respectively, have their emitter electrodes coupled to ground and their collector electrodes coupled to output terminals 96*b* and 96*c*, respectively. As switching transistor 92 and PNP transistors 101 and 102 are all floated above ground, their respective base electrodes are driven by the emitter-collector circuit of an associated one of the inverting drive transistors 110, 111 and 112, respectively. The base electrode of transistor 110 receives the ACCEL signal, while the respective base electrodes of transistor 111 and 112 respectively receive switching signals $A_1$ and $B_1$. The base electrodes of transistors 103 and 104 respectively receive switching signals $B_2$ and $A_2$.

Assuming all signal inputs $A_1$, $A_2$, $B_1$, $B_2$ and ACCEL are initially grounded (the logic zero state), all of transistors 92, 101-104 and 110-112 are in the cut-off state and do not conduct; current does not flow through motor 40. When a positive voltage is applied to terminals $A_1$, $A_2$ and the ACCEL signal is of sufficient magnitude, transistors 110, 92, 111, 101 and 104 are saturated. Current flows from acceleration voltage line 90 through acceleration switching transistor 92 into bridge driver means input terminal 96*a*, thence through saturated transistor 101 and bridge driver output terminal 96*b* into motor input terminal 40*b*. The current leaving motor input terminal 40*c* flows through saturated transistor 104 to ground. It should be understood that the voltage on acceleration line 90 is somewhat greater than the desired value of acceleration voltage $V_1$ to allow for the saturation voltage drops of transistors 92, 101 and 104.

The motor is now receiving a positive acceleration voltage at input terminal 40*b* and accelerates in the forward direction. As the acceleration voltage is greater than regulated voltage $V_K'$, diode 94 is reverse biased and no current flows into, or out of, voltage regulation means 86 (D.C. level $V_K'$). As was previously set forth, the acceleration condition is maintained for a time interval T, after which time interval ACCEL returns to a logic zero level, placing transistors 110 and 92 in the cut-off condition. Bridge driver input terminal 96*a* no longer receives acceleration voltage $V_1$, whereupon diode 94 is forward biased and conducts to apply constant speed voltage $V_K$ with positive polarity at motor input terminal 40*b*. It should be similarly understood that adjustable regulated voltage $V_K'$ is slightly greater than the required constant speed voltage $V_K$ to allow for voltage drops through forward-biased diode 94 and saturated transistors 101 and 104. The motor now rotates at a constant output shaft speed to move carriage 20 forward at the desired constant velocity across paper document 21.

When the furthest point of carriage travel for line being printed has been reached in the forward direction, inputs $A_1$ and $A_2$ return to the logic zero level, placing transistors 111, 101 and 104 in the cut-off state, while inputs $B_1$, $B_2$ and ACCEL are enabled to the logic one level, saturating transistors 112, 102, 103, 110 and 92. The positive polarity acceleration voltage on line 90 is applied through saturated transistor 92 to bridge driver input 96*a* and thence through saturated transistor 102 to motor input terminal 40*c*. As motor input terminal 40*b* is coupled to ground through saturated transistor 103, the increased acceleration voltage appears across motor 40 with opposite polarity and initially decelerates the motor output shaft and then accelerates the motor output shaft in the reverse direction. The signal at the ACCEL input changes to the logic zero level, returning transistors 110 and 92 to the cut-off state and enabling the application of regulated voltage $V_K$ with positive polarity at motor terminal 40*c*, after time interval $T_r$ as given by equation 5, to enable continued carriage motion in the reverse direction at the desired constant speed.

At the completion of line printing in the reverse direction, for bidirectional printers, or upon completion of a "carriage return" for unidirectional printers, the signals at inputs $B_1$ and $B_2$ return to the logic zero level, placing transistors 112, 102 and 103 in the cut-off state to end reverse motion drive. Logic one levels are again applied at inputs $A_1$, $A_2$ and ACCEL for a time interval $T_r$ to initially decelerate the carriage 20 to zero velocity and then towards constant printing speed in the forward direction. The above-described cycle is repeated as often as is required to accelerate the carriage to constant speed in the forward and reverse directions for continuously printing of successive lines of characters (for either unidirectional or bidirectional printers).

Motor 40 is disabled to halt all motion of carriage 20 by enabling the logic one level at the ACCEL input and at inputs $A_1$, $A_2$ or $B_1$, $B_2$, opposite to the pair of A and B terminals immediately previously energized, for a time interval T, as given by equation (4), to brake rotation of motor output shaft 40*a* and bring carriage 20 to a halt in as short a time interval as is practical. The required logic states for inputs $A_1$, $A_2$, $B_1$, $B_2$ and ACCEL are summarized in Table I for the various operating modes:

TABLE I

| | Input Logic State | | | Accel. Time |
|---|---|---|---|---|
| Operating Mode | $A_1$&$A_2$ | $B_1$&$B_2$ | Accel | Duration |
| Motor Off | 0 | 0 | — | — |
| Fwd. Accel. From Stop | 1 | 0 | 1 | T |
| Fwd. Constant Speed | 1 | 0 | 0 | — |
| Brake-End of Fwd. Travel | 0 | 1 | 1 | T |
| Accel-Fwd. to Rev. | 0 | 1 | 1 | $T_r$ |
| Rev. Accel. From Stop | 0 | 1 | 1 | T |
| Rev. Constant Speed | 0 | 1 | 0 | — |
| Accel-Rev. to Fwd. | 1 | 0 | 1 | $T_r$ |
| Brake-End of Rev. Travel | 1 | 0 | 1 | T |

OPERATION OF LOGIC MEANS

The required logic input levels for $A_1$, $A_2$, $B_1$, $B_2$ and ACCEL are generated by logic means 200.

The FWD and REV inputs are received (FIG. 6*a*) from known printer electronics (not shown for simplicity), and each signal is coupled to one input of a pair of 2-input NAND gates 201 and 202, respectively, each having its remaining input coupled through common line 203 to a "Stop-Go" switch 204. In the "Stop" condition, line 203 is coupled via switch contact 204*a* to ground, the logic zero level, to cause a logic one level to simultaneously appear at the outputs of gates 201 and 202, to prevent movement of carriage 20, as will hereinafter be more fully explained. In the "Go" condition, line 203 is coupled via switch contact 204*b* and resistor 205 to a positive voltage, the logic one level, thereby enabling gates 201 and 202 to selectively pass a FWD or REV signal, when present.

The output of gate 201 is inverted by a first inverter 210 whose output is coupled in common to the inputs of second and third logic inverters 211 and 212, respectively, and to one input of a two-input NAND gate 213. Another inverter 215 inverts the output of gate 202 and couples its output to the inputs of a pair of inverters 216 and 217, respectively, and one input of a two-input NAND gate 218. The output of inverter 211 is coupled in common to one input of each of a pair of two-input NAND gates 220 and 221, respectively, while the output of inverter 216 is coupled in common to the remaining input of NAND gate 220 and to one input of a two-input NAND gate 222. The output of NAND gate 220 is coupled to the positive-logic trigger input 223*a* of a first monostable multivibrator 223, at whose $\overline{Q}$ output 223*b* a logic zero pulse having a time interval $T_x$, as established by the value of first timing capacitance 224 and first timer resistance 225, will appear responsive to the rising voltage at trigger input 223*a*. The output of gate 220 is also coupled to the input of a differentiator circuit consisting of a series capacitance 228 and a shunt resistance 229; the differentiated output of gate 220 is coupled from the junction between capacitance 228 and resistance 229 to a negative-logic trigger input 230*a* of a second monostable multivibrator 230 also having a rising-edge-triggering input 230*b* coupled to first multivibrator $\overline{Q}$ output 223*b*. The complementary Q and $\overline{Q}$ outputs 230*c* and 230*d*, respectively, develop respective logic one and logic zero level pulses of adjustable time duration $T_v$ as established by second timing capacitance 231 and variable timing resistance 232. In a preferred embodiment, resistance 232 is adjustably set to $T_v$ equal to T per equation (4).

Second multivibrator $\overline{Q}$ output 230*d* is coupled in common to the remaining input of each of NAND gates 221 and 222, while second multivibrator Q output 230*c* is coupled in common to one input of each of two-input NAND gates 235 and 236.

The outputs of inverter 212 and NAND gate 236 are coupled to respective first and second inputs of a two-input NAND gate 240 having its output coupled both to a first noise-suppression shunt capacitance 241 and to the positive-logic trigger input of a third monostable multivibrator 242. The $\overline{Q}$ output 242*b* of monostable multivibrator 242 is normally at the logic one level and produces a logic zero level pulse of time duration Ty, as established by third timing capacitance 243 and third timing resistance 244, responsive to a rise to the logic one level at trigger input 242*a*. Third multivibrator $\overline{Q}$ output 242*b* is coupled in common to clock input 245*a* of a first type-D bistable element 245, to the remaining input of NAND gate 218 and to a first input of a two-input NAND gate 247.

The outputs of inverter 217 and NAND gate 235 are coupled to respective first and second inputs of a two-input NAND gate 250 having its output coupled both to a second noise-suppression shunt capacitance 251 and to the positive-logic trigger input of a fourth monostable multivibrator 252, having a fourth timing capacitance 253 and fourth timing resistance 254, responsive to application of logic one level at trigger input 252*a*. Fourth multivibrator $\overline{Q}$ output 252*b* is simultaneously coupled to clock input 255*a* of a second type-D bistable element 255, to the remaining input of NAND gate 213 and to a first input of a two-input NAND gate 257.

The respective outputs of NAND gates 213 and 218 are shunted by noise-suppression capacitors 258 and 259, respectively, and coupled to the negative-logic preset and clear inputs 260*a* and 260*b*, respectively, of a third bistable element 260. The respective Q and $\overline{Q}$ outputs 260*c* and 260*d* of third bistable element 260 are respectively coupled to the remaining inputs of respective NAND gates 235 and 236.

The output of NAND gate 221 is coupled both to the data input 245*b* of first bistable element 245 and to the remaining input of NAND gate 257. The output of NAND gate 257 is inverted by an inverter 262 and coupled both to noise-suppression shunt capacitor 263 and to the negative-logic clear input 245c of first bistable element 245. The $\overline{Q}$ output 245d of first bistable element 245 is coupled in common to the inputs of a first pair of driver inverters 265 and 266, each having an open-collector-type output coupled to a positive supply potential through terminating resistors 267 and 268, respectively. The outputs of inverting drivers 265 and 266 respectively constitute the bridge means logic input signals $A_1$ and $A_2$.

The output of NAND gate 222 is coupled both to the data input 255b of second bistable element 255 and to the remaining input of NAND gate 247. The output of NAND gate 247 is inverted by an inverter 272 and coupled both to noise-suppression shunt capacitor 213 and to the negative-logic clear input 255c of second bistable element 255. The $\overline{Q}$ output 255d of second bistable element 255 is coupled in common to the inputs of a second pair of driver inverters 275 and 276, each having an open-collector-type output coupled to positive supply potential through terminating resistors 277 and 278, respectively. The outputs of inverting drivers 275 and 276 respectively constitute the bridge means logic input signals $B_1$ and $B_2$.

A two-input NAND gate 280 (FIG. 6b) receives the $\overline{Q}$ outputs $C_1$ and $C_2$, (FIG. 6a) respectively, from both third and fourth multivibrators 242, 252, respectively, and has an output 280a, coupled to the positive-logic trigger input 285a of a fifth monostable multivibrator 285. Respective logic 1 and logic 0 level pulses appear at the Q and $\overline{Q}$ outputs 285b and 285c, respectively, for an adjustable time interval $T_v'$ established by a fifth timing capacitance 286 and an adjustable resistance 287. In a preferred embodiment, resistance 287 is adjusted to set $T_v'$ equal to $T_r$, where $T_r$ is given by equation (5).

The Q output 285b is coupled to a negative-logic trigger input 285d, such that multivibrator 285 cannot be retriggered during the $T_v'$ time interval. The $\overline{Q}$ output 285 thus falls to a logic 0 level at the commencement of the logic one level at trigger input 285a and subsequently remains at the logic zero level for the time interval $T_r$.

The logic 0 level pulse of $T_r$ duration is coupled to one input of a two-input NAND gate 290, having an output 290a coupled to the ACCEL input of bridge means 96 (FIG. 6b).

Figure 7:
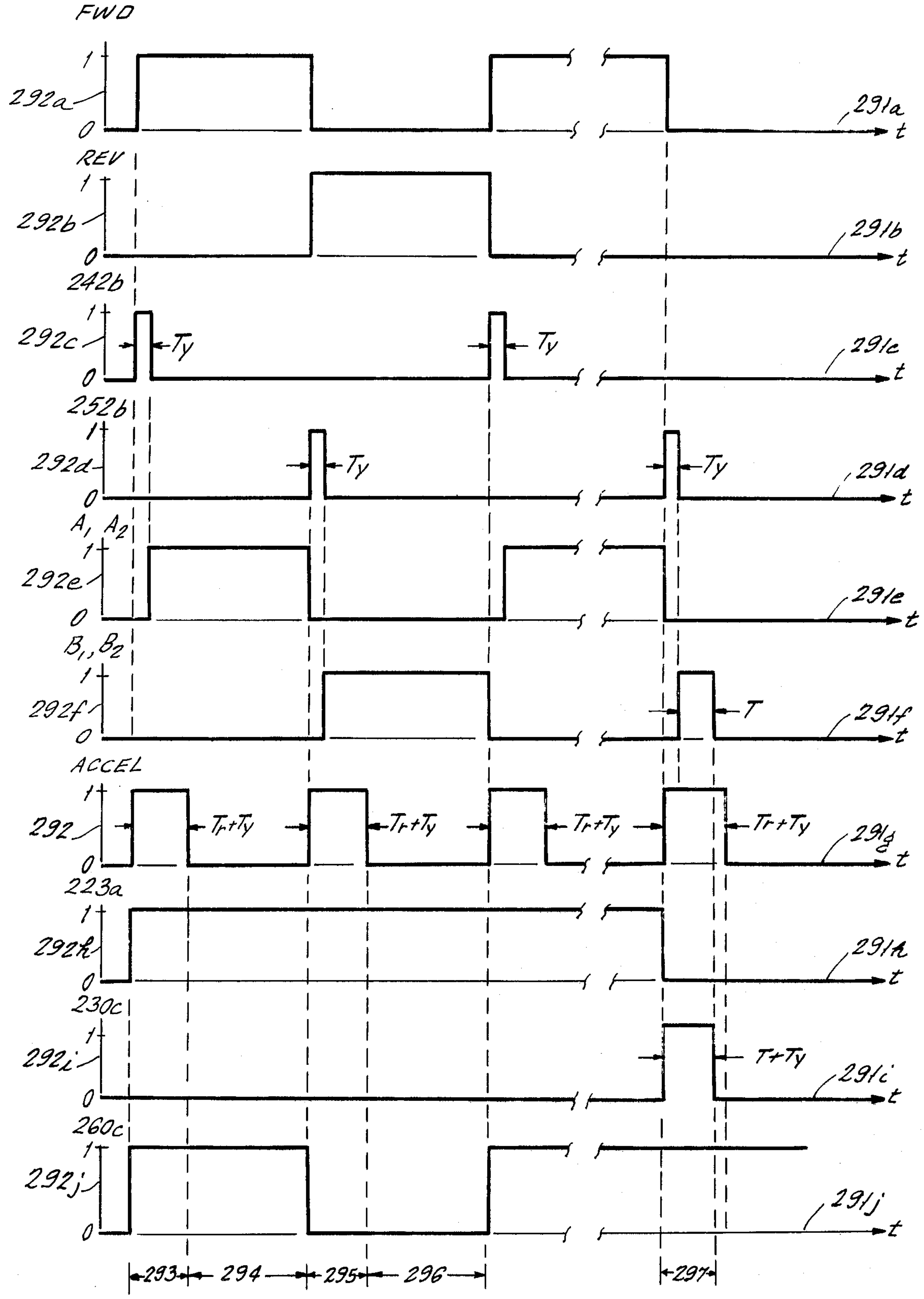
FIG. 7 is a set of coordinated graphs illustrating operational waveforms of the logic means in a "Constant Speed" mode.

Referring now to FIGS. 6a, 6b and FIG. 7, in which latter Figure each of abscissae 291a–291j are scaled with equal coordinated increments of time and each of ordinates 292a–292j indicate the levels of various logic waveforms in logic means 200.

In operation, assuming that "Stop-Go" switch 204 is in the "Go" position coupling positive voltage to line 203 through resistance 205, carriage travel is initiated in the forward direction by the presence of respective logic one and logic zero levels on the FWD and REV inputs, respectively. The positive FWD and negative REV signals are typically generated after a line of characters to be printed have been received and stored in a register provided in the printer. The output of inverter 215 is at the logic zero level and the output of inverter 216 couples a logic one level to the associated input of NAND gate 222. As second multivibrator 230 has previously timed out, its $\overline{Q}$ output 230d couples another logic one level to the remaining input of NAND gate 222 to cause a logic zero level to appear at the associated input of NAND gate 247 and at negative-logic clear input 255c to force $\overline{Q}$ output 255d to a logic one level and set bridge means inputs $B_1$ and $B_2$ to the logic zero level through inverters 275 and 276.

Simultaneously, with the application of the aforementioned FWD and REV signals, the output of inverter 210 changes to the logic one level and the output of inverter 211 changes to the logic zero level causing the output of NAND gate 221 to change to the logic one level.

The output of inverter 210 is also coupled as a logic one level to positive-logic trigger input 242a to immediately trigger third multivibrator 242 and cause a logic zero pulse of duration $T_y$, typically four milli-seconds, to appear at $\overline{Q}$ output 242b. This logic zero pulse produces a logic one pulse of duration $T_y$ at the output of NAND gate 280 and at positive-logic trigger input 285a of fifth multivibrator 285. Upon being triggered, fifth multivibrator $\overline{Q}$ output 285c develops a logic one level pulse at the ACCEL input to bridge means 96.

At the end of the logic zero level pulse, third multivibrator $\overline{Q}$ output 242b returns to the logic one level and the rising edge at positive-logic input 245a sets the $\overline{Q}$ output 245d of first bistable element 245 to the logic zero level responsive to the logic one level present at data input 245b, to establish bridge inputs $A_1$ and $A_2$ at the logic one level.

Thus, when FWD is active, bridge inputs $B_1$ and $B_2$ are immediately forced inactive and the ACCEL input is applied. After the short time delay interval $T_y$ of third multivibrator 242, bridge inputs $A_1$ and $A_2$ become active and the motor drive circuit operates in the "Forward Acceleration" mode as in region 293 of FIG. 7, for a time interval established by fifth multivibrator 285. The delay between inactivating inputs $B_1$ and $B_2$ before activating $A_1$ and $A_2$ protects the bridge circuit 96 from being damaged. When fifth multivibrator 285 times out, the acceleration time interval ends and the ACCEL signal becomes inactive to allow regulated voltage $V_k'$ to be applied through forward-biased diode 94 to place the motor in the "Forward Constant Speed" mode of region 294 of FIG. 7. The logic zero level at the output of inverter 211 causes a logic one level to be applied to first multivibrator trigger input 223a through gate 220 to inhibit the triggering of second multivibrator 230 for a time interval $T_x$, typically 5 milli-seconds, to prevent false triggering due to signal bounce from gate 220. The purpose of second multivibrator 230 will be explained hereinbelow.

The direction of carriage travel is reversed as FWD goes to the logic zero level and REV goes to the logic one level. The outputs of respective inverters 211 and 216 change to the logic one and logic zero levels, respectively. The output of gate 220 remains at the logic one level, as one of its inputs is still at the logic zero level, and second multivibrator 230 remains untriggered. The output of inverter 217 falls to the logic zero level coupling a logic one level to positive-logic trigger input 252a of fourth multivibrator 252. Fourth multivibrator $\overline{Q}$ output 252b immediately falls to the logic zero level and remains at this level for time duration $T_y$, typically four milli-seconds. The logic zero level is coupled to one input of NAND gate 257 to place a logic zero level on first bistable element clear input 245c to return the $\overline{Q}$ output 245d thereof to the logic one level and change bridge inputs $A_1$ and $A_2$ to the logic zero level.

The logic zero level at the output of inverter 216 is coupled to one input of NAND gate 222 to apply a logic one level to input **255*b* of second bistable element 255. Upon the cessation of the logic zero pulse at the fourth multivibrator $\overline{Q}$ output 252*b*, the rising waveform is applied to second bistable element clock input 255*a* to transfer the logic one level from data input 255*b* to $\overline{Q}$ output 255*b* and set bridge inputs $B_1$ and $B_2$ to the logic one level. The logic zero pulse is also applied via the $C_2$ input to gate 280 to trigger fifth multivibrator 285 and couple a logic one level pulse of duration $T_r$ to the ACCEL input of bridge means 96. The circuit is now in the "Reverse Acceleration" mode of region 295 of FIG. 7, causing the motor 40** to decelerate to zero velocity and then accelerate in the reverse direction.

After fifth multivibrator 285 times out, its $\overline{Q}$ output **285*c* reverts to the logic one level and couples a logic zero level to the ACCEL input, removing the acceleration voltage and coupling the voltage across motor 40 to $V_k$, for the "Reverse Constant Speed" mode, as shown in region 296** of FIG. 7.

The above described sequence continues as long as the levels of FWD and REV change in mutually exclusive fashion, i.e., FWD=$\overline{\text{REV}}$.

The initial delay of duration $T_y$ between the time that $A_1$ and $A_2$ go to the logic zero level and $B_1$ and $B_2$ go to the logic one level, or vice-versa, is established to allow transistors 101 and 104, or transistors 102 and 103, to be turned completely to the cut-off state before the remaining pair of transistors are saturated, so as to prevent storage time in these transistors from causing short circuit paths to ground if both sets were switched at the same instant.

In the event that line printing is to be halted at any point along the length of a line, both the FWD and REV inputs are set to the logic zero level to initial the "Brake" mode of operation shown in region 297 of FIG. 7. The outputs of both inverters 211 and 216 are then both at the logic one level to set the output of gate 220 to the logic zero level to trigger second multivibrator 230 through differentiation capacitor 228. Second multivibrator $\overline{Q}$ output **230*d* immediately falls to a logic zero level which is simultaneously applied to respective inputs of NAND gates 221 and 222, while the logic one level pulse of time duration T is applied from Q output 230*c* to one input of NAND gates 235 and 236**.

The output levels of respective gates 235 and 236 depend upon the respective states of the Q and $\overline{Q}$ outputs of third bistable element 260, as steered by the signals from gates 218 and 213, respectively. When control logic 200 is in the "Forward Constant Speed" mode, $\overline{Q}$ output **260*c* is at the logic one level and, conversely, when logic means 200 is in the "Reverse Constant Speed" mode, Q output 260*d* is at the logic one level. Thus, third bistable element 260** memorizes the direction of printing immediately preceding the commencement of the "Brake" mode.

The logic one pulse from second multivibrator Q output **230*c* is steered by whichever one of gates 235 and 236 receives a logic one level from bistable element 260 to provide a logic zero pulse to one of NAND gates 240 or 250 and cause a logic zero pulse to appear at the associated trigger input of either third or fourth multivibrators 242 or 252. After second multivibrator 230 times out, its Q output 230*c* reverts to the logic zero level and returns one of trigger inputs 242*a* and 252*a* to the logic one level to trigger the associated multivibrator 242 or 252 to set the bridge means inputs $A_1$ and $A_2$, or $B_1$ and $B_2$, to reverse the direction of rotation of motor 40 and to simultaneously trigger fifth multivibrator 285 to apply the ACCEL signal to bridge means 96. The presence of the ACCEL input and the remaining directional inputs $A_1$, $A_2$ or $B_1$, $B_2$ decelerates motor 40 for a total time interval established by the pulse width of fifth multivibrator 230, the time interval during which the remaining driver inputs $A_1$, $A_2$ or $B_1$, $B_2$ are at the logic one level, to brake motor 40** in the shortest practical time interval.

Resumption of carriage movement in either direction after a halt is enabled by the presence of respective FWD and REV inputs and with the sequence of signals described hereinabove.

In a preferred embodiment, wherein a typical system requires 60 milli-seconds to accelerate from constant speed in one direction to constant speed in the opposite direction with a thrity volt accelerating voltage $V_1$, fifth multivibrator 285 produces a nominal 64 milli-second pulse ($T_r + T_y$) and similarly, as deceleration from a constant speed in either direction to zero speed nominally requires 30 milli-seconds, the output pulse of second multivibrator 230 is adjusted for a nominal 34 milli-second pulse ($T + T_y$).

FAST REVERSE MODE

In the "Constant Speed" mode described hereinabove, carriage 20 moves at the same velocity in both the forward and the reverse directions, which is preferred for printers capable of printing in both directions. In a line printer printing characters only in the forward direction, a preferred embodiment utilizes a "Fast Reverse" mode to greatly increase the speed of carriage return in the reverse direction, during which time no printing occurs.

It should be thus be understood that application of the increased acceleration voltage $V_f$ for longer time intervals results in a significantly increased final value of carriage velocity. Thus, by substantially increasing the length of time that $V_f$ is applied to motor 40 when REV is active, the time required for carriage 20 to return to its left-most position is greatly reduced.

Figure 8:
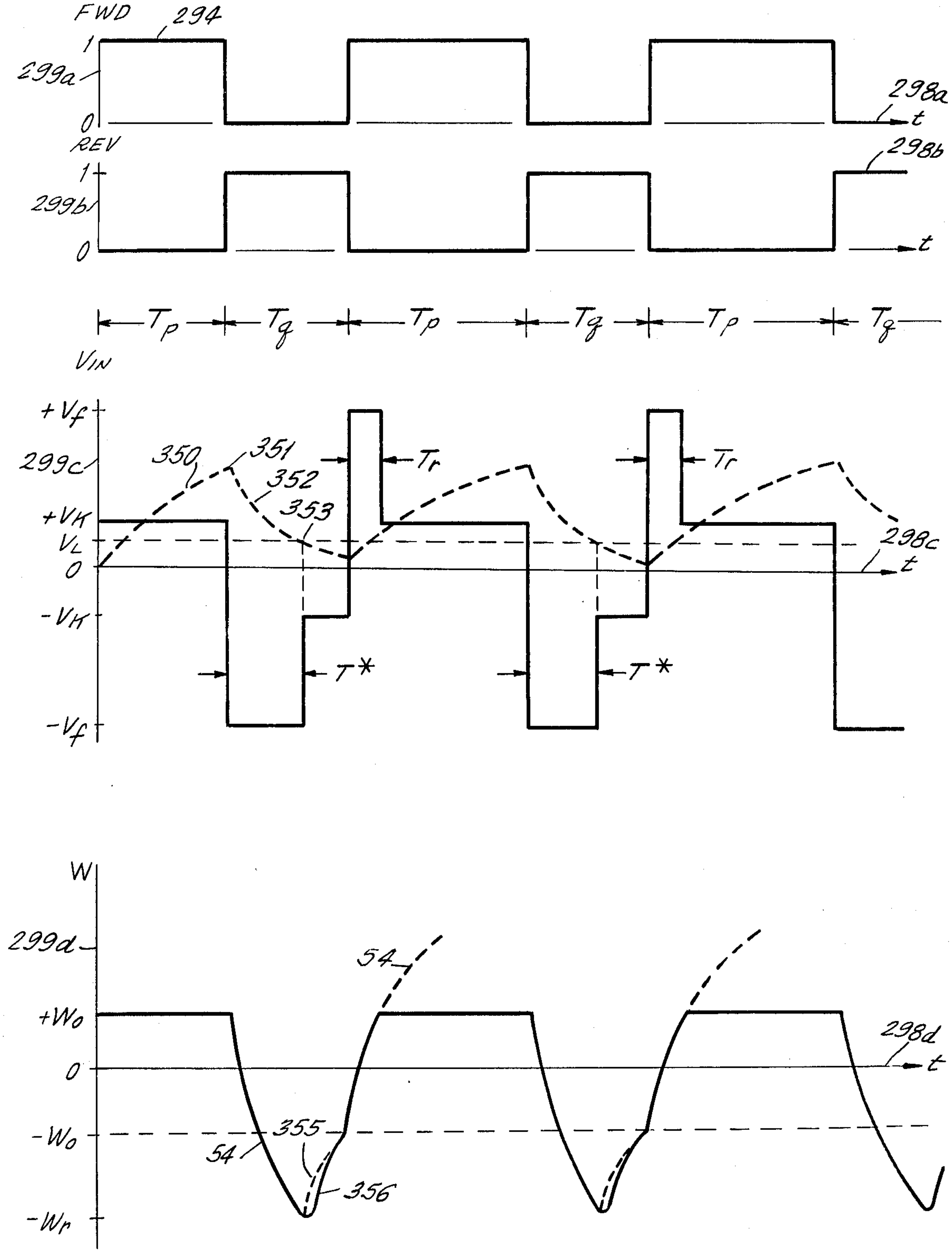
FIG. 8 is a set of coordinated graphs illustrating other operational waveforms of the logic means in a "Fast Reverse" mode.

Referring now to FIG. 8, wherein each coordinated abscissa **298*a*–298*d*** is scaled in equal intervals of time (*t*) and ordinates **299*a*, 299*b*, 299*c* and 299*d*** respectively represent the logic state of FWD, the logic state of REV, the magnitude of motor input voltage $V_{in}$ and the magnitude of motor shaft output speed W, it can be seen that the FWD and REV inputs are applied in mutually-exclusive fashion with FWD being at the logic one level during all printing time intervals $T_p$ in the forward direction and at the logic zero level during return intervals $T_q$ in the reverse direction. The time interval T*, during which the increased acceleration voltage is applied in the reverse direction, is considerably greater than the normal acceleration time interval T. A larger peak reverse speed results and a decreased time interval is required for carriage return ($T_q < T_p$).

The duration of time interval T* cannot be fixed at a constant value as the printer does not always print full lines of data. The length of each line may vary from one character to a full line of typically 132 characters. For short lines of characters, T* must be of short duration to avoid excessive carriage velocity as the carriage returns to its left-most position to prevent the carriage and/or the printer from being damaged. Thus, the carriage return time will be proportional to the time interval utilized for printing a line portion immediately preceding the initiation of carriage return. For example, if one allows 0.8 seconds for printing a full line of characters, and 0.2 seconds for proper carriage return, proper time intervals for a line only one half as long would be 0.4 seconds for the printing time interval and 0.1 second for carriage return. The value of T* should therefore preferrably be substantially proportional to the length of time that FWD is at the logic one level during the printing of the proceeding line of characters.

The output of gate 201 (FIG. *6a*) is coupled via line E to the positive-logic clock input 301*a* (FIG. *6b*) of a fourth bistable element 301. The output of inverter 210 is coupled via line F and a series resistor 302 to the base electrode of a transistor 303. The emitter-collector circuit of transistor 303 is connected between ground and a voltage divider formed of resistors 304 and 305 in series with a source of reference potential $V_r$ on bus 306. Reference potential $V_r$ is established by a zener diode 310 in series with a dropping resistor 311 connected to acceleration voltage line 90; a capacitance 312 shunts reference zener diode 310 to remove ripple and noise components of the reference voltage. The base electrode of a switching transistor 315 is coupled to the junction between voltage divider resistors 304 and 305 and its emitter-collector circuit is coupled between reference voltage bus 306 and a charging capacitance 316 through a charging resistance 317.

One input 320*a* of a voltage comparator 320 is coupled to the ungrounded terminal of charging capacitor 316 while the remaining comparator input 320*b* is coupled to the output of a reference voltage divider formed by a first resistance 321 coupled to reference bus 306 and a second divider resistor 322 coupled to ground potential. Comparator 320 receives a positive supply voltage from bus 306 via line 323. Output 320*c* of comparator 320 is coupled to a negative-logic clear input 301*b* of fourth bistable element 301 and to the common terminal between resistances 324 and 325. The Q output 301*c* of fourth bistable element 301 is coupled via resistance 327 to the base electrode of a discharge transistor 328 having its emitter-collector circuit coupled between ground and first comparator input 320*a* through discharge resistance 329.

The $\overline{Q}$ output 301*d* of fourth bistable element 301 is coupled to a first pole 335*a* of a double pole switch 335, having its remaining pole 335*b* coupled to the $C_2$ line originating at fourth miltivibrator $\overline{Q}$ output 252*b*. In the "Constant Speed" mode, second pole 335*b* is coupled to contact 335*c* forming one input of NAND gate 280, while first switch pole 335*a* is coupled to an open circuit. In the "Fast Reverse" mode first switch pole 335*a* is coupled to contact 335*d* and second switch pole 335*b* is coupled to switch contact 335*e*, both of which contacts are coupled through separate resistors 337 and 338 to a positive, or logic one, voltage level. Switch contact 335*e* is also coupled to the negative-logic trigger input 340*a* of a sixth monostable multivibrator 340 producing a logic zero level pulse of duration $T_v''$ at its output 340*b*, as established by sixth timing capacitance 341 and another variable timing resistance 342. The $\overline{Q}$ output 340*b* is coupled to a positive-logic triggering input 340*c* to prevent retriggering.

Switch contact 335*d* and sixth multivibrator $\overline{Q}$ output 340*b* are coupled to respective inputs of a two-input NAND gate 345 having an output coupled through a logic inverter 346 to the remaining input of NAND gate 290.

In operation, the "Fast-Reverse" mode is enabled by setting switch 335 to the connective positions shown in broken line in FIG. *6b*. FWD becomes active at the initiation of line printing and the same sequence of events as hereinabove described occurs. During forward travel in region 294 (FIG. 7), line E is set to a logic zero level and line F is set to a logic one level to saturate transistor 303. The values of resistors 304 and 305 are selected to saturate transistor 315 when transistor 303 is saturated, thereby coupling charging resistor 307 to reference voltage bus 306. Charging current flows into capacitor 316 to raise the voltage at first comparator input 320*a* along charging curve 350 toward $V_r$ with a charging time constant established by the values of charging capacitance 316 and charging resistance 317. The peak voltage 351 to which capacitor 316 will ultimately charge is established by the duration of print time $T_p$ and is very nearly proportional to the length of line printed.

The value of threshold voltage $V_L$ established by resistors 321 and 322 is selected to enable a logic one level at comparator output 320*c* only if capacitor 316 charges to a voltage indicative of printing more than approximately 15% of a full line of characters.

If less than 15% of the full line has been printed, a logic zero level at comparator output 320*c* clears fourth bistable element 301 to provide respective Q and $\overline{Q}$ outputs 301*c* and 301*d* at the logic zero and the logic one levels, respectively. In this condition, transistor 328 is not saturated and will not discharge capacitor 316. The input of gate 345 is maintained at the logic one level to enable normal carriage return motion via the triggering of sixth multivibrator 340 as previously described for the "Constant-Speed" mode.

Upon completion of printing a line of characters of length greater than approximately 15% of a full line, capacitor 316 has charged to a voltage greater than threshold voltage $V_L$ to remove the clear enabling logic zero level from input 301*b*. Line F falls to the logic zero level placing transistors 303 and 315 in the cut-off state to terminate charging of capacitance 316. Simultaneously, line E rises to the logic one level to clock the invariant logic one level at fourth bistable element data input 301*e* and establish the respective Q and $\overline{Q}$ outputs 301*c* and 301*d* at the logic one and logic zero levels, respectively. The Q output 301*c* saturates transistor 328, starting the discharge of 316 via resistor 329, and the logic zero level at $\overline{Q}$ output 301*d* appears at one input of gate 345 until capacitor 316 has discharged through discharge resistor 329 to a voltage less than threshold voltage $V_L$ and comparator output 320*c* falls to the logic zero level to place a logic zero reset level on clear input 301*b*, removing the logic zero level at the associated input of gate 345.

Simultaneously with the presence of a logic one level on line E, fourth multivibrator $\overline{Q}$ output 252*b* falls to the logic zero level, as previously described, and enables negative-logic trigger input 340*a* of sixth multivibrator 340. Multivibrator 340 is triggered to form a logic zero level pulse of duration $T_v''$ at its output 340*b* and at the associated remaining input of gate 345.

The output of gate 345 and the ACCEL input to bridge means 96 will both be at the logic one level responsive to either output 340*b* or $\overline{Q}$ output 301*d* being at the logic zero level and the duration of reverse direction acceleration is controlled by the output having the longer duration logic zero level. Thus, for reverse travel after printing only a "short" line of characters (i.e. <15% of a full line), the duration of the pulse from fourth multivibrator 340 predominates and returns carriage 20 in the reverse direction at the same speed as in the "Constant Speed" mode, while for reverse movement after printing a line segment greater than approximately 15% of the total line length, the duration T* of the logic zero level from fourth bistable element $\overline{Q}$ output 301*d* exceeds the duration of the pulse from sixth multivibrator 340 to maintain the output of gate 345 at the logic one level even after sixth multivibrator 340 has timed out and its $\overline{Q}$ output 340*b* returns to the logic one level. During this increased reverse-travel time interval, the output speed of motor 40 continues to increase in reverse direction along curve 54 (FIG. 8) to reach a final speed $W_r$ in the reverse direction when the voltage across capacitor 316 discharges to equal the threshold voltage $V_L$ at comparator input 320*b*.

Upon clearing of fourth bistable element 301, $\overline{Q}$ output 301*d* returns to the logic one level and removes the ACCEL input to bridge means 96. The constant speed voltage $V_K$ is now coupled to motor 40 and attempts to decrease the return speed of carriage 20 to reverse constant speed $W_o$ along the exponential curve 355. As carriage 20 is traveling at a greater than normal speed in the return direction, its momentum temporarily modifies ideal curve 355 to maintain a generally slower decay of return speed along actual curve 356 until constant speed $W_O$ is substantially reached just as carriage 20 has returned to its left-most position. The logic states of FWD and REV are now reversed and the sequence of signals described for the forward direction of travel in the "Constant Speed" mode commenced with increased acceleration voltage $V_f$ being applied to motor 40 during direction-reversing acceleration time interval $T_r$. At the conclusion of each subsequent line of characters, the "Fast-Reverse" mode is again enabled responsive to the magnitude of voltage to which capacitor 316 has charged.

The present invention has been described with reference to a preferred embodiment thereof; many variations and modifications will now become apparent to those skilled in the art. It is preferred, therefore, that the present invention be limited not by the specific disclosure herein, but only by the appended claims.

What is claimed is:

1. Apparatus for providing constant printing speed in a printer comprising carriage means, means mounted on said carriage means for printing characters, symbols and the like at selected positions along a line in a first direction of motion of said carriage means, and means for providing a first signal to enable motion of said carriage means in said first direction, said apparatus comprising:

a d.c. motor having first and second electrical input terminals and an output shaft including means for directly mechanically coupling the shaft to said carriage means;

the rotational speed of said output shaft and the linear speed of said carriage means in said first direction having a time-invariant relationship to the magnitude of a voltage having a first polarity applied at said first input terminal with respect to said second input terminal;

a first d.c. voltage source having a substantially constant magnitude;

a second d.c. voltage source having an essentially constant magnitude, the magnitude of said second voltage source being less than the magnitude of said first voltage source;

first means responsive to the commencement of said first signal for briefly coupling said first voltage source to said first and second input terminals of said motor with said first polarity to rapidly accelerate said carriage means essentially to said constant printing speed in a first time interval; and second means for coupling said second voltage source to said first and second input terminals of said motor immediately after said first means decouples said first voltage source from said motor input terminals; said essentially constant magnitude of said second voltage source being selected to cause said carriage means to continue moving at said constant printing speed after said first means decouples said first voltage source from said first and second motor input terminals;

said first means comprising third means responsive to the commencement of said first signal for generating a first auxiliary signal having a time duration equal to said first time interval; and fourth normally open means for coupling said voltage source to said first and second motor input terminals only when said first auxiliary signal is present.

2. Apparatus as set forth in claim 1, wherein said fourth means comprises a first switching element having an input coupled to said first voltage source, an output coupled to one of said first and second motor input terminals and a control input coupled to said third means; said first switching element having respective conductive and open paths between said input and said output responsive to said first auxiliary signal being respectively present and absent at said control input.

3. Apparatus as set forth in claim 1, wherein said third means is a monostable multivibrator having a trigger input receiving said first signal, an output at which said first auxiliary signal is formed responsively to the commencement of said first signal at said trigger input, and means for adjustably controlling the time duration during which said output is actuated to equal that interval required to accelerate said carriage means essentially to said constant printing speed.

4. Apparatus as set forth in claim 1, further comprising means for returning the carriage means in a second direction opposite said first direction responsive to the absence of said first signal.

5. Apparatus as set forth in claim 1, further comprising means for returning said carriage means at said constant printing speed in a second direction opposite said first directions responsive to the absence of said first signal.

6. Apparatus as set forth in claim 5, wherein said returning means comprises fifth means responsive to the cessation of said first signal for rapidly decelerating said carriage means to a zero velocity in said first direction and for rapidly accelerating said carriage means substantially to said second constant printing speed in said second direction; and sixth means for continuously moving said carriage means at said constant printing speed in said second direction after the rapid acceleration thereof.

7. Apparatus for providing constant printing speed in a printer comprising carriage means, means mounted on said carriage means for printing characters, symbols and the like at selected positions along a line in a first direction of motion of said carriage means, and means for providing a first signal to enable motion of said carriage means in said first direction, said apparatus comprising:

a d.c. motor having first and second electrical input terminals and an output shaft including means for directly mechanically coupling the shaft to said carriage means;

the rotational speed of said output shaft and the linear speed of said carriage means in said first direction having a time-invariant relationship to the magnitude of a voltage having a first polarity applied at said first input terminal with respect to said second input terminal;

a first d.c. voltage source having a substantially constant magnitude;

a second d.c. voltage source having an essentially constant magnitude, the magnitude of said second voltage source being less than the magnitude of said first voltage source;

first means responsive to the commencement of said first signal for briefly coupling said first voltage source to said first and second input terminals of said motor with said first polarity to rapidly accelerate said carriage means essentially to said constant printing speed in a first time interval; and second means for coupling said second voltage source to said first and second input terminals of said motor immediately after said first means decouples said first voltage source from said motor input terminals; said essentially constant magnitude of said second voltage source being selected to cause said carriage means to continue moving at said constant printing speed after said first means decouples said first voltage source from said first and second motor input terminals;

said second means comprises a second switching element having an input coupled to said second voltage source and an output coupled to said one of said first and second motor input terminals; said second switching element being adapted to form a conductive path between said input and said output only when the voltage at said input is greater than the voltage at said output.

8. Apparatus for providing constant printing speed in a printer comprising carriage means, means mounted on said carriage means for printing characters, symbols and the like at selected positions along a line in the direction of motion of said carriage means, and means for providing a signal to enable motion of said carriage means in a first direction, said apparatus comprising:

a d.c. motor having first and second electrical input terminals and an output shaft including means for directly mechanically coupling the shaft to said carriage means;

the rotational speed of said output shaft and the linear speed of said carriage means having a time-invariant relationship to the magnitude of a voltage having opposed first and second polarities respectively applied and said first and said second input terminals;

a d.c. voltage source having an essentially constant magnitude;

means for coupling said voltage source to said first and second motor input terminals with said first polarity responsive to the presence of said signal to enable said carriage means to move at said constant printing speed in said first direction; and means responsive to the absence of said signal for reversing the connections between said coupling means and said motor input terminals to cause said carriage means to move at said constant printing speed in said second direction.

9. Apparatus as set forth in claim 8, wherein said connection reversing means comprises an input terminal connected to said coupling means; first means for forming a conductive path between said input terminal and said first motor input terminal responsive only to the presence of said first signal; and second means for forming a conductive path between said input terminal and said second motor input terminal responsive only to the absence of said signal.

10. Apparatus as set forth in claim 9, wherein said first means comprises a first semiconductor switching element having an input electrode coupled to said input terminal, an output electrode coupled to said first motor input terminal and a control electrode;

said second means comprises a second semiconductor switching element having an input electrode coupled to said input terminal, an output electrode coupled to said second motor input terminal and a control electrode;

said first and second semiconductor switching element adapted to provide respective conductive and open circuit paths between their input and output electrodes responsive to the respective presence and absence of said first and second signals, respectively, at their control electrodes.

11. Apparatus as set forth in claim 10, wherein said connection reversing means is a bridge means further comprising a common terminal; third means for forming a conductive path between said common terminal and said second motor input terminal responsive only to the presence of first signal; and fourth means for forming a conductive path between said common terminal and said first motor input terminal responsive only to the absence of said first signal.

12. Apparatus as set forth in claim 11, wherein said third means comprises a third semiconductor switching element having an input electrode coupled to said common terminal, an output electrode coupled to said second motor input terminal and a control electrode; said forth means comprises a fourth semiconductor switching element having an input electrode coupled to said common terminal, an output electrode coupled to said first motor input terminal and a control electrode; said third and fourth semiconductor switching elements adapted to provide respective conductive and open circuit paths between their input and output electrodes responsive to the respective presence and absence of said first and second signals, respectively, at their control electrodes.

13. Apparatus for providing constant printing speed in a printer comprising carriage means, means mounted on said carriage means for printing characters, symbols and the like along a line in the direction of motion of said carriage means and means for providing respective first and second signals to enable motion of said carriage means in respective first and second directions, said apparatus comprising:

a d.c. motor having first and second electrical terminals and an output shaft including means for directly mechanically coupling the shaft to said carriage means;

the rotational speed of said output shaft and the linear speed of said carriage means in said first and second directions respectively having a time-invariant relationship to the magnitude of a voltage having respective first and second opposed polarities applied at said first input terminal with respect to said second input terminal;

a first d.c. voltage source having an essentially constant magnitude;

a second d.c. voltage source having a substantially constant magnitude, the magnitude of said second voltage source being greater than the magnitude of said first voltage source;

first means responsive to the initiation of each of said first and second signals for initially coupling said second voltage source to said first and second motor input terminals for a first time interval sufficient to rapidly accelerate said carriage means essentially to said constant printing speed;

second means responsive to said second voltage source being decoupled by said first means from said first and second input terminals for coupling said first voltage source to said first and second motor input terminals to maintain movement of said carriage means at said constant printing speed after said carriage means has been rapidly accelerated thereto; and third means coupled between said first and second means and said motor for applying said voltage to said motor with said first and second polarities respectively responsive to the presence of said first and second signals respectively to enable said carriage means to be rapidly accelerated to and maintained at said constant printing speed in said first and second directions respectively.

14. Apparatus as set forth in claim 13, wherein said first means comprises means for generating a first auxiliary signal for said first time interval after initiation of said first signal; means for generating a second auxiliary signal for said first time interval after initiation of said second signal; and means for selectively providing a circuit path between said second voltage source and said third means responsive to either one of said first and second auxiliary signals.

15. Apparatus as set forth in claim 14, wherein said first auxiliary signal generating means comprises a first element having a trigger input receiving said first signal and having an output at which said first auxiliary signal is formed responsive to said trigger input of said first element being enabled; and said second auxiliary signal generating means comprises a second element having a trigger input receiving said second signal and having an output at which said second auxiliary signal is formed responsive to said trigger input of said second element being enabled.

16. Apparatus as set forth in claim 14, wherein said circuit path providing means comprises a first switching element having an input terminal coupled to said second voltage source, an output terminal coupled to said third means and a control terminal, said first switching element being adapted to establish a completed electrical path between its input and output terminals when said control terminal receives one of said first and second auxiliary signals.

17. Apparatus as set forth in claim 13, wherein said second means comprises means for selectively providing a circuit path between said first voltage source and said third means only when the voltage at said third means is less than the magnitude of said first voltage source.

18. Apparatus as set forth in claim 17, wherein said selective path providing means comprises a unidirectional switching element having a first terminal coupled to said third means and a second terminal coupled to said first voltage source, said unidirectional switching element being adapted to conduct only when the voltage at said second terminal is greater than the voltage at said first terminal.

19. Apparatus as set forth in claim 13, wherein said third means comprises a common terminal; an input terminal coupled to said first and second means; first switch means coupling said input terminal to said first motor input terminal and said common terminal to said second motor input terminal responsive to said first signal; and second switch means coupling said input terminal to said second motor input terminal and said common terminal to said first motor input terminal responsive to said second signal.

20. A printer comprising: carriage means, means mounted on said carriage means for selectively printing characters, symbols and the like along a line in the direction of motion of said carriage means and means for providing a first signal to initiate motion of said carriage means in a first direction, said apparatus comprising:

a d.c. motor having first and second electrical terminals and an output shaft including means for directly mechanically coupling the shaft to said carriage means;

the rotational speed of said output shaft and the linear speed of said carriage means in said first direction having a time-invariant relationship to the magnitude of a voltage having a first polarity applied at said first input terminal with respect to said second input terminal;

a first d.c. voltage source having a first magnitude;

a second d.c. voltage source having a second magnitude, the magnitude of said second voltage source being greater than the magnitude of said first voltage source;

switch means for coupling said first voltage source to said first and second motor input terminals responsive to the presence of said first signal to move said carriage means at a first speed in said first direction, and for coupling said second voltage source to said first and second motor input terminals responsive to the absence of said first signal to move said carriage means in a second direction opposite said first direction at a second speed greater than said first speed.

21. A printer as set forth in claim 20, further comprising means for continuously monitoring the position of said carriage means along said line; and means for reducing the voltage applied to said first and second motor input terminals to reduce the velocity of said carriage means responsive to said continuous monitoring means indicating that said carriage means is approaching an end point of said line in said second direction.

22. A printer as set forth in claim 21, wherein said continuous monitoring means is adapted to monitor the position of said carriage means during travel in both said first and second directions; and further comprising first means for enabling said switch means to coupled said second voltage source to said first and second motor input terminals for a preset time interval sufficient to rapidly halt said carriage means and rapidly accelerate said carriage means toward a constant speed in said second direction and immediately reduce the voltage level applied to said motor terminals at the end of said preset time interval, responsive to said continuous monitoring means indicating that said carriage means has moved less than a predetermined distance in said first direction from an initial point on said line.

23. A printer as set forth in claim 22, wherein said continuous monitoring means comprises means for storing a variable amount of a selected electrical quantity; means operative during movement of said carriage means in said first direction for varying the stored amount of said quantity from an initial amount as a function of the displacement of said carriage means in said first direction; and means operative during movement of said carriage means in said second direction for returning the stored amount of said quantity to said initial amount as a function of time.

24. A printer as set forth in claim 23, wherein said electrical quantity storing means comprises an element for storing electrical charge; and said quantity varying means comprises a first resistor coupled to said charge storing element; and first switching means for coupling said second voltage source to said first resistor responsive to the presence of said first signal to increase the amount of electric charge stored in said charge storing element at a rate determined by the values of said first resistor and said charge storing element.

25. A printer as set forth in claim 24, wherein said quantity returning means comprises a second resistor coupled to said charge storing element; and second switching means for coupling said second resistor across said charge storing element responsive to the absence of said first signal to enable said charge storing element to discharge at a rate determined by the values of said second resistor and said charge storing element.

26. A printer as set forth in claim 23, wherein said voltage reducing means comprises means for comparing the amount of said stored electrical quantity against a selected reference value; and bistable means having a set input receiving said first signal, a reset input coupled to said comparing means and an output activated at the cessation of said first signal at said set input and deactivated when the amount of said stored quantity is equal to said selected value; and second means for enabling said switch means to couple said second voltage source to said first and second motor input terminals only when said output of said bistable means is activated.

27. A printer as set forth in claim 26, wherein said comparing means comprises third means for establishing said selected reference value; a comparator element having a first input coupled to said electrical quantity storing means, a second input coupled to said third means and an output coupled to said reset input of said bistable means and energized only when said stored quantity exceeds said selected value.

28. A printer as set forth in claim 27, wherein said third means establishes said selected reference value equal to the amount of said electrical quantity stored when said carriage means moves said predetermined length of a complete line in said first direction;

said voltage reducing means being activated only when said carriage means is at a position along said line having a length less than said predetermined length of said line to prevent excessive return acceleration of said carriage means.

29. A printer as set forth in claim 28, wherein said predetermined length is approximately equal to 15/100 ths of a complete printing line.

30. Apparatus for providing constant printing speed in a printer comprising carriage means, means mounted on said carriage means for printing characters, symbols and the like at selected positions along a line in the direction of motion of said carriage means and means for providing a first signal to enable motion of said carriage means in a first direction, said apparatus comprising:

an open-loop d.c. motor control means including a d.c. motor having first and second electrical input terminals and an output shaft including means for directly mechanically coupling the shaft to said carriage means;

the rotational speed of said output shaft and the linear speed of said carriage means in said first direction having a time-invariant relationship to the magnitude of a voltage having a first polarity applied at said first input terminal with respect to said second input terminal;

a source of at least one d.c. voltage;

first means responsive to said first signal for coupling said source to said first and second input terminals of said motor with said first polarity to enable said carriage means to rapidly accelerate and thereafter move at said constant printing speed in said first direction;

second means coupled between said first means and said first and second motor input terminals for reversing the polarity of said source applied to said first and second motor input terminals and including timing means for operating said second means over a predetermined time interval equal to the time interval required to reduce the velocity of said carriage means to zero in said first direction; said second means being responsive to the cessation of said first signal to halt the motion of said carriage means at any point along the length of travel in said first direction.

31. Apparatus as set forth in claim 30, wherein said first means is adapted to inhibit said second means and re-enable said carriage means to continue movement in said first direction responsive to the resumption of said first signal.

32. Apparatus as set forth in claim 31, wherein said second means comprises third means for reversing the connections of said first means to said first and second motor input terminals to couple said source to said motor with a second polarity opposite to said first polarity; and fourth means responsive to the cessation of said first signal for activating said third means for a time interval sufficient to reduce the velocity of said carriage means to zero in said first direction to halt said carriage means.

33. Apparatus as set forth in claim 32, wherein said printer further comprises means for providing a second signal to enable motion of said carriage means in a second direction opposite to said first direction; said apparatus further comprising fifth means for actuating said third means to couple said source to said first and second motor input terminals with said second polarity respective to said second signal to enable said carriage means to be rapidly decelerated to said zero velocity in said first direction and thereafter be rapidly accelerated to and move at said constant printing speed in said second direction; and said second means being adapted to halt said carriage means at any point along the length of travel in said first and second directions responsive to a halt signal.

34. Apparatus as set forth in claim 33, wherein said second means further comprises fifth means for generating said halt signal responsive to the absence of both said first and second signals.

35. Apparatus as set forth in claim 34, wherein said fifth means is a first gating element having a first input receiving said first signal, a second input receiving said second signal and an output at which said halt signal appears only when said first and second signals respectively are absent from said first and second inputs respectively.

36. Apparatus as set forth in claim 33, wherein said second means further comprises sixth means for storing that the state of said first and second signals immediately before said halt signal is provided; seventh means coupled to said sixth means for providing the opposite states of said first and second signals to said third means after said halt signal is provided to cause rapid deceleration of said carriage means to said zero velocity; and eighth means for deactivating said first and third means at the completion of said time interval to completely halt the motion of said carriage means.

37. Apparatus as set forth in claim 36, wherein said sixth means comprises a second gating element having a first input receiving said first signal, a second input receiving said halt signal and an output activated only when said first signal is present and said halt signal is absent;

a third gating element having a first input receiving said second signal, a second input receiving said halt signal and an output activated only when said second signal is present and said halt signal is absent;

a storage element having a set input coupled to said second gating element output, a reset input coupled to said third gating element output, and an output activated and maintained at respective first and second levels responsive to the activation of said second and third gating elements outputs, respectively.

38. Apparatus as set forth in claim 36, wherein said seventh means comprises fourth and fifth gating elements each having a first input coupled to said sixth means, a second input coupled to said fourth means and an output;

said output of said fourth element enabling said third means to said second polarity if said sixth means has stored said first signal before said halt signal is received;

said output of said fifth gating element enabling said third means to said first polarity if the output of said sixth means has stored said second signal before said halt signal is received.

39. Apparatus as set forth in claim 36, wherein said fourth means comprises an element having a trigger input and an output activating said third means for said time interval responsive to said halt signal being received at said trigger input.

40. Apparatus for providing constant printing speed in a printer comprising carriage means, means mounted on said carriage means for printing characters, symbols and the like at selected positions along a line in a first direction of motion of said carriage means, and means for providing a first signal to enable motion of said carriage means in said first direction, said apparatus comprising:

a d.c. motor having first and second electrical input terminals and an output shaft including means for directly mechanically coupling the shaft to said carriage means;

the rotational speed of said output shaft and the linear speed of said carriage means in said first direction having a time-invariant relationship to the magnitude of a voltage having a first polarity applied at said first input terminal with respect to said second input terminal;

a first d.c. voltage source having a substantially constant magnitude, said source having first and second output terminals;

a second d.c. voltage source having a substantially constant magnitude lower than that of first voltage source; a first common terminal, divide means coupling one terminal of the second source to said common terminal;

the second output terminals of said first and second source being at a common reference level;

fifth switch means for coupling said first source to said common terminal for a preset time interval to initiate motion of the carriage means at an accelerated rate;

a switching network having a first pair of first and second switch means for respectively selectively coupling said common terminal to the first and second input terminals of said motor when activated; and a second pair of third and fourth switching means for respectively selectively coupling the first and second input terminals of said motor to said reference level when activated;

means responsive to controlling movement of said carriage means in a first direction for activating only said first and fourth switch means and responsive to controlling movement of said carriage means in the opposite direction for activating only said second and third switch means;

said switch means each having an input terminal, an output terminal and a control terminal;

the input terminals of said first and second switch means being coupled to a first common terminal;

the input terminals of said third and fourth switch means being coupled to a second common terminal;

the outputs of said first and third switch means being coupled to a third common terminal;

the outputs of said second and fourth switch means being coupled to a fourth common terminal;

said third and fourth common terminals being respectively coupled to the first input and second input terminals of said motor;

said first and second common terminals being respectively coupled to the first and second output terminals of said first source;

diode means coupled between said first common terminal and the first output terminal of said first source;

a second d.c. voltage source having a d.c. level greater than said first source;

fifth switch means incuding a control input for selectively coupling said second source to said first common terminal when said control input is activated;

means for activating said fifth switch means control input for a predetermined time interval responsive to initiation of movement of said carriage means in either direction;

said diode means being adapted to couple said first source output terminal to said first common terminal only when said fifth switch means control input is deactivated.

* * * * *

UNITED STATES PATENT AND TRADEMARK OFFICE
CERTIFICATE OF CORRECTION

PATENT NO. : 4,079,298

DATED : March 14, 1978

INVENTOR(S) : Jay Prager

It is certified that error appears in the above-identified patent and that said Letters Patent are hereby corrected as shown below:

In the ABSTRACT, line 20, after "acceleration," insert --to--.

line 23, "being" should read --bring--.

Column 5, line 10, "40c" should read --40a--.

Column 7, line 42, "driven" should read --driver--.

Column 11, line 17, "213" should read --273--.

Column 13, line 52 "$\bar{Q}$" should read --Q--.

Column 13, line 54, "Q" should read --$\bar{Q}$--.

Column 20, line 42, "forth" should read --fourth--.

Column 25, line 42, before "element" insert --gating--.

Signed and Sealed this

*Fifteenth* Day of *August 1978*

[SEAL]

*Attest:*

RUTH C. MASON
*Attesting Officer*

DONALD W. BANNER
*Commissioner of Patents and Trademarks*